Feb. 2, 1932.  H. A. HUSTED  1,843,324

STEERING WHEEL

Filed Jan. 7, 1929

INVENTOR
HARRY A. HUSTED
BY
Evans and McCoy
ATTORNEY

Patented Feb. 2, 1932

1,843,324

UNITED STATES PATENT OFFICE

HARRY A. HUSTED, OF CLEVELAND, OHIO, ASSIGNOR TO THE H. A. HUSTED COMPANY, OF DETROIT, MICHIGAN, A CORPORATION OF MICHIGAN

STEERING WHEEL

Application filed January 7, 1929. Serial No. 330,780.

This invention relates to steering wheels, and particularly to steering wheels of the reinforced composition material type. This invention furthermore is an improvement over the invention shown in my copending application Serial No. 167,387 filed February 11, 1927, which contains dominating claims.

The principal object of this invention is to provide a composition steering wheel which is neat in appearance, economical to manufacture, and extremely rigid in construction.

Another object is to provide a composition steering wheel with a reinforcing spider embedded in the composition material and a separately formed hub portion having driving means thereon extending into the composition material.

A further object is to provide a composition steering wheel with a reinforcing spider embedded in the composition material and with a separately formed hub secured thereto and having metal to metal contact with the reinforcing spider.

A still further object is to provide a composition steering wheel with a reinforcing spider embedded in the composition material and with a separately formed hub having means extending into the composition material contacting with the metal of the spider to form driving means and to provide means for carrying the securing bolts.

These being among the objects of the present invention, the same consists of certain features of construction and combinations of parts to be hereinafter described with reference to the accompanying drawings, and then claimed, having the above and other objects in view.

In the drawings which illustrate a suitable embodiment of the present invention:

Heretofore, steering wheels formed of composition material molded around a reinforcing spider and having a separately formed hub member, have never been provided with a satisfactory rigid connection between the hub and reinforcing means. It has been found that the composition material expands and contracts a substantial amount during changes in weather conditions, with the result that the bolts which secure the hub to the wheel become loosened during contraction of the composition material, certain sweating between the connected parts occurs, and the composition material tends to flow under the pressure of the securing bolts for the hub. This has the very serious disadvantage that the bolts may, in time, work out or allow the wheel to become loose on the hub. The connection of the wheel to the hub may be weakened and cause a serious accident. Furthermore in wheels of this type used in the past, the bolts which secure the hub to the spider have always taken all the driving strain exerted during the steering of the vehicle on which the wheel is used. These bolts finally become bent, with the result that in many instances it is very difficult to tighten or remove them.

It is therefore the aim of the present invention to overcome these disadvantages in the manner set forth in the following description.

Figure 1:
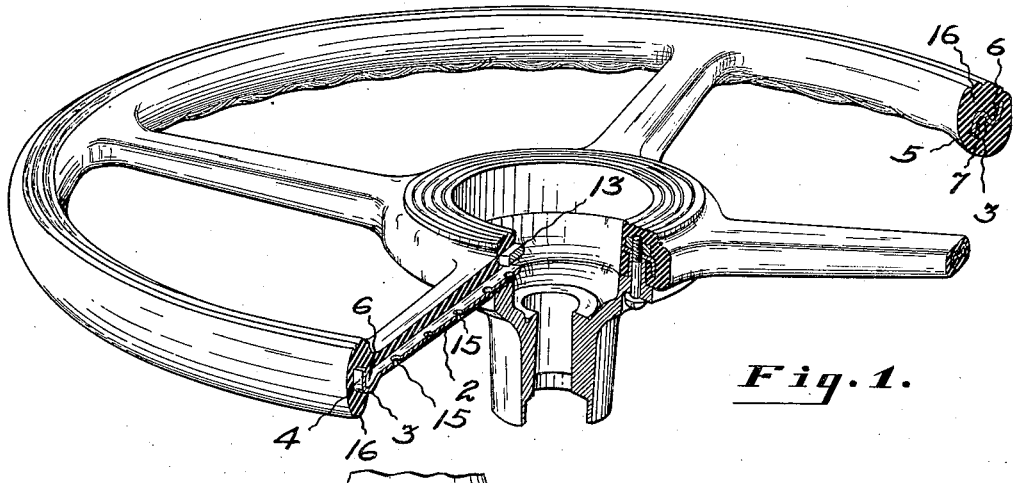
Figure 1 is a perspective view of a steering wheel having portions broken away to show the hub and reinforcing spider.

Referring to the accompanying drawings in which like numerals refer to like parts throughout the several views, the reinforcing spider for the wheel, which is preferably stamped from a single piece of metal, is formed with a central hub 1, integral spokes 2 radiating therefrom, and a continuous rim 3 integrally united with the spokes 2. The rim 3 of the spider as shown in Fig. 1 is S-shaped in section and has a continuous upwardly extending flange 4 at its outer edge, and downwardly extending flanges 5 along the inner edges thereof. The flanges 4 and 5 together with the web between the same provide the rim 3 with an outer upwardly presenting channel 6 and an inner downwardly presenting channel 7.

Figure 2:
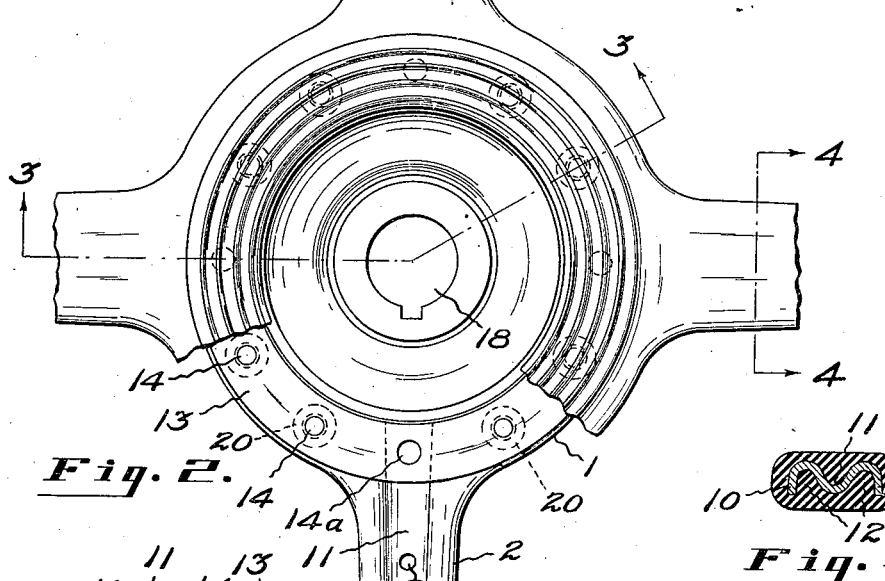
Fig. 2 is an enlarged plan view of the central portion of the wheel having a portion of the composition material broken away around a reinforcing ring and one of the spokes.
Figure 4:
Fig. 4 is a section taken on the line 4—4 of Fig. 2 showing the shape of one of the spokes.
Figure 3:
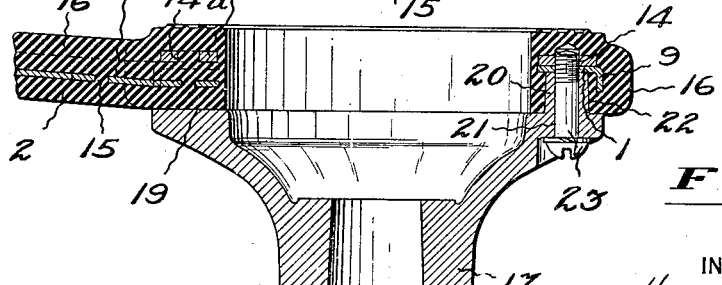
Fig. 3 is a section taken on the line 3—3 of Fig. 2.

The internal flanged portion of the hub 1 of the spider is generally L-shaped in section as shown in Fig. 3 and has a downwardly extending flange 9 and a central hub opening. The spokes 2 as shown in Fig. 4 are generally M-shaped in section and have downwardly extending side flanges 10 which are continuous with the inner flanges 5 of the rim 3 and the flanges 9 of the hub 1. The flanges 10 of each spoke 2 together with the deformed web interconnecting the same, provide the spoke with an upwardly presenting channel 11 longitudinally thereof and extending into the outer rim groove 6, and with spaced downwardly presenting channels 12 extending into or continuous with the inner rim groove 7. The upwardly presenting channels 11 of the spokes 2 as shown in Figs. 1 and 2, extend through the hub 1 to the inner edge thereof. An anchor ring 13 is mounted on the upper face of the hub portion 1 of the spider. A plurality of spaced threaded openings 14 and 14a are formed around the anchor ring 13, the openings 14 being in axial alignment with similar openings in the hub 1 of the spider. The openings 14a are postioned in the ring 13 to lie directly above the upwardly presenting channels 11 formed in the spokes 2 of the spider for a purpose which will soon be described.

The reinforcing spider is formed with integral hub, spoke and rim portions which are flanged and channeled, as just described, to provide substantially uniform strength throughout every portion of the wheel, so that in the event of a serious wreck, the driver of the vehicle will not be injured by breakage of the steering wheel.

A plurality of perforations 15 are preferably formed in the spokes 2 of the spider, and also in the rim 3, although they are not specifically shown in the rim in the drawings. The composition material 16 that is molded around the spider is subjected to heat and pressure that cause it to flow around the spider and through the perforations 15 to intimately contact with the metal thereof at all points and become bonded thereto, as shown in the drawings. During the molding process the composition material 16 flows through the openings 14a in the reinforcing ring 13 so that it is integrally united through the openings.

The steering wheel is provided with a separately formed hub 17 having a central conical opening 18 therein for positioning it on the steering column shaft (not shown) of a vehicle. The hub 17 is formed with a plane upper surface 19 against which the lower surface of the steering wheel seats when the hub and wheel are assembled. A plurality of spaced integral driving lugs 20 are formed on the hub to project upwardly from the upper face 19 thereof, and are drilled to provide openings 21 having the same spacing as the openings 14 formed in the reinforcing ring 13 for the spider.

When the composition material 16 is molded around the spider, suitable cores are provided in the mold, so that openings 22 will be formed in the wheel which have the same axes as the spider hub openings 14 and which extend from the flat lower face of the wheel hub portion to the spider hub 1. These openings 22 register with and receive the lugs 20 formed on the hub 17 when the wheels are assembled.

In assembled position the lugs 20 extend into the openings 22 formed in the composition material and abut against the lower face of the spider hub 1. Screws 23 extending through the lug openings 21 and threaded into the openings 14 in the spider hub and anchor ring 13, firmly secure the same together, providing metal to metal contact therebetween. The lower hub face of the wheel also normally seats against the plane face 19 of the hub 17 as shown in Fig. 3.

It can be seen that any substantial amount of shrinkage or contraction of the composition material due to weather changes or flow of the material in service will in no way affect the relationship between the hub 17 and the reinforcing spider hub, because the screws 23 firmly secure the same together in contacting relationship. It can be seen that this has a decided advantage over constructions previously used wherein there was no metal to metal contact between the separately formed hub and any part of the wheel. It is evident that by providing a metal to metal contact in the present invention, the probability of the securing screws becoming loosened is materially lessened.

It can also be seen in the present invention that the securing screws are not subjected to bending stresses produced during the steering of the vehicle on which the wheel is used, because they are encased throughout their length by the driving lugs 20 which are formed integral with the hub 17. These securing screws 23 are, however, subjected to certain shearing stresses, which are not appreciable in an article of the class described.

It is to be understood, however, that the sections of the reinforcing spider and other parts of the steering wheel are shown for purposes of explanation and illustration only, and that formal changes may be made in the specific embodiment of the invention described without departing from the spirit and substance of the broad invention, the scope of which is commensurate with the appended claims.

What I claim is:
1. A steering wheel comprising a reinforcing spider, composition material completely molded around said spider, a separately formed wheel hub, lugs formed on said hub extending into said composition material to provide driving means for said hub, and means securing the wheel hub to the spider.

2. A steering wheel comprising a reinforcing spider, composition material completely molded around said spider, a separately formed wheel hub spaced from said spider by said composition material, driving lugs formed integral with said hub and extending into said composition material, and means for securing said hub to said wheel.

3. A steering wheel comprising a metallic reinforcing spider, composition material molded completely around said spider, a separately formed metallic wheel hub spaced from said spider by said composition material, driving lugs formed integral with said hub extending into said composition material and contacting with said spider, and securing means for attaching said hub to said spider.

4. A steering wheel comprising a metallic reinforcing spider having a hub portion, composition material molded completely around said hub portion, a separately formed metallic wheel hub spaced from said spider hub by said composition material, driving lugs formed integral with said separately formed hub extending into said composition material and contacting with said spider hub, and securing means extending through said lugs for securing said hub to said wheel.

5. A steering wheel comprising a metallic one-piece reinforcing spider having an integral central hub portion, composition material completely surrounding said spider, a separately formed metallic wheel hub spaced from said spider hub by said composition material, driving lugs formed integral with said separately formed hub and extending into said composition material to engage said spider hub, and screw means carried by said driving lugs and threaded into said spider hub to rigidly unite the same for permitting expansion and contraction of said composition material without affecting the relative positions of said spider hub and separately formed hub.

6. A steering wheel comprising a metallic reinforcing spider having an integral central hub portion, an annular reinforcing ring secured to the upper surface of said hub portion, composition material molded completely around said annular ring and hub portion, a separately formed wheel hub spaced from central hub portion by said composition material, driving lugs formed integral with said hub and extending into said composition material, screw means extending through said lugs and threaded into said spider hub and reinforcing ring for rigidly engaging said lugs with the lower face of said spider hub to permit contraction and expansion of said composition material without disturbing the relative positions of said spider and separately formed hub.

7. In a composition steering wheel having an embedded metallic reinforcing spider, a separately formed wheel hub spaced from said spider by said composition, means for securing said wheel to said hub, and means permitting contraction and expansion of said composition without affecting the relative positions of said spider and hub.

8. In a composition steering wheel having an embedded metallic reinforcing spider, a separately formed wheel hub spaced from said spider by said composition, means for securing said wheel to said hub, and means permitting contraction and expansion of said composition without affecting the relative positions of said spider and hub, comprising screw means extending through said hub and threaded into said spider, and metallic means on said hub surrounding said screw means to engage said spider with metal to metal contact.

In testimony whereof I affix my signature.

HARRY A. HUSTED.